UNITED STATES PATENT OFFICE.

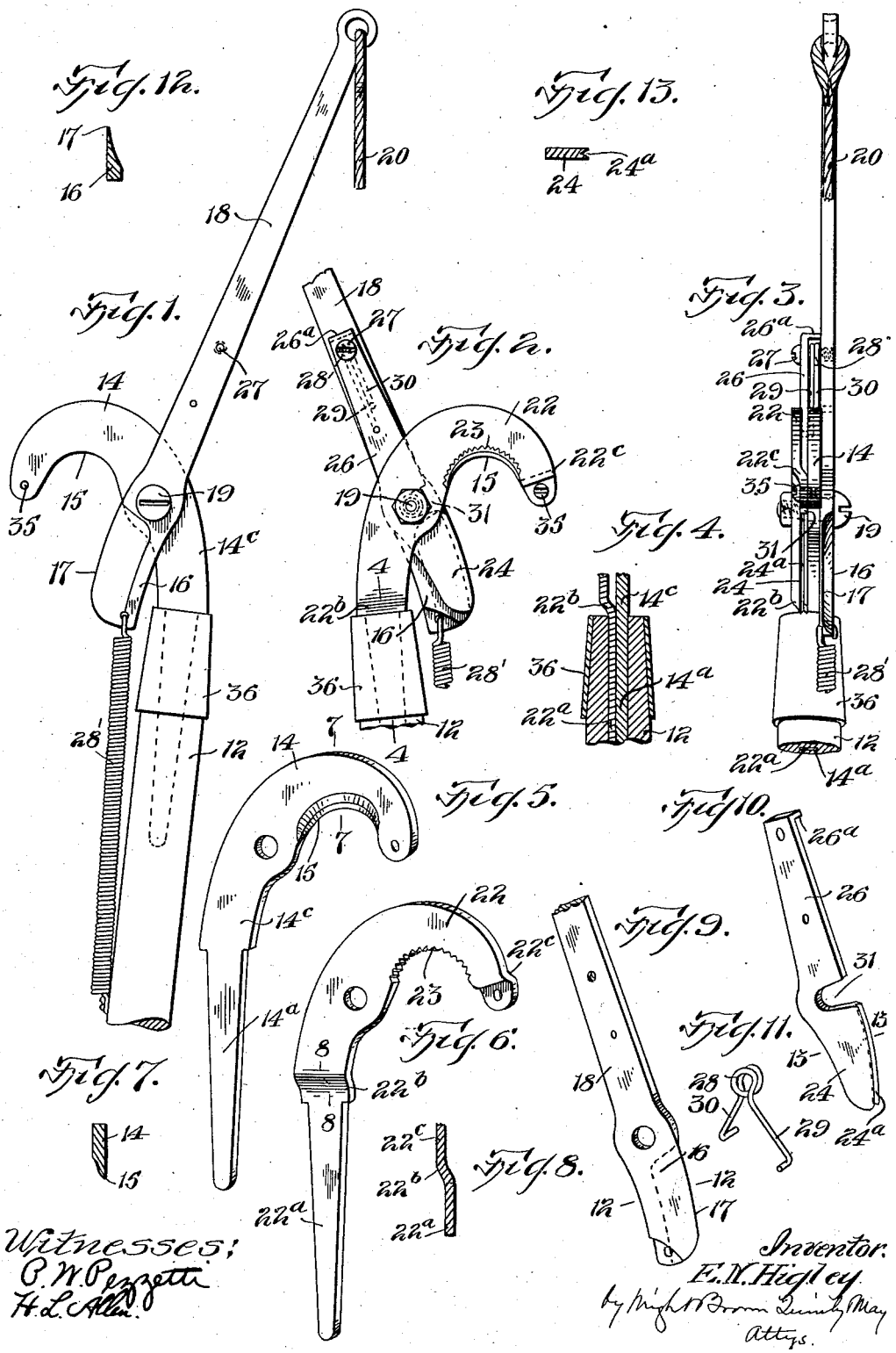

EBEN N. HIGLEY, OF SOMERSWORTH, NEW HAMPSHIRE, ASSIGNOR TO MAUDE HIGLEY, OF SOMERSWORTH, NEW HAMPSHIRE.

PRUNING IMPLEMENT.

1,025,626.      Specification of Letters Patent.      Patented May 7, 1912.

Application filed February 25, 1911. Serial No. 610,787.

*To all whom it may concern:*

Be it known that I, EBEN N. HIGLEY, of Somersworth, in the county of Strafford and State of New Hampshire, have invented certain new and useful Improvements in Pruning Implements, of which the following is a specification.

This invention relates to a pruning implement of the character shown in Letters Patent of the U. S., granted to me Feb. 23, 1909, No. 913,290, and comprising a pair of shears or pruning members, one of which is affixed to a shank carried by an elongated rod or pole, while the other is pivoted to said shank and affixed to the shorter arm of a lever, the longer arm of which is adapted to be moved to close the shearing members upon a branch and sever the same. A pruning implement embodying the invention set forth in said Letters Patent is provided with means for clamping the branch to be severed at a point in close proximity to the shears, and in such manner that the implement may be operated to sever a branch without exerting injurious breaking strain thereon.

The present invention is an improvement on the above-mentioned patented invention, and has for its object to provide a simpler, less expensive and more durable and efficient construction whereby the desired results are attained.

The invention consists in the improved construction and combination of parts hereinafter described and claimed.

Of the accompanying drawings, forming a part of this specification,—Figure 1 represents a side elevation of a pruning implement embodying my invention. Fig. 2 represents an elevation of the opposite side of the implement. Fig. 3 represents an edge view of the same. Fig. 4 represents a section on line 4—4 of Fig. 2. Fig. 5 represents a perspective view of the fixed pruning member. Fig. 6 represents a perspective view of the fixed clamping member. Fig. 7 represents a section on line 7—7 of Fig. 5. Fig. 8 represents a section on line 8—8 of Fig. 6. Fig. 9 represents a perspective view of the movable pruning member. Fig. 10 represents a perspective view of the movable clamping member. Fig. 11 represents a perspective view of the spring which controls the movable clamping member. Fig. 12 represents a section on line 12—12 of Fig. 9. Fig. 13 represents a section on line 13—13 of Fig. 10.

The same reference characters indicate the same parts in all of the figures.

In the drawings, 12 represents an elongated rod or pole which is of sufficient length to enable the implement to be operated at an elevated point in a tree by a person standing on the ground.

14 represents a fixed shearing member or blade, the cutting edge 15 of which is curved, said member projecting from one side of the rod and having a shank $14^c$ terminating in a tang $14^a$ driven firmly into the end of the rod.

16 represents a movable shearing member or blade having a cutting edge 17 facing the edge 15. The movable shearing member 16 is formed on a lever 18 which is pivoted by a screw 19 to the shank of the fixed member 14, the shearing member 16 constituting the shorter arm of the lever. To the longer arm of the lever is connected an elongated operating device 20, which may be flexible cord extending to the lower end portion of the pole 13 where it may be connected with an operating lever pivoted to the pole, as usual in implements of this character. The arrangement of the shearing members 14 and 16 is such that when power is applied to the lever 18 to move the member 16 toward the member 14, the cutting edges of said members will coöperate in shearing off a branch or twig interposed between said cutting edges.

The cutting edge 15 has a reëntrant curve forming a recess, and the cutting edge 17 has a salient curve which is relatively abrupt at its outer end, so that when the member 16 is held in its normal position shown in Figs. 1 and 2, by a spring 28', connected at one end with the member 16 and at the other end with the rod 12, the curved cutting edge 17 is adapted to guide twigs and limbs into the recess formed by the curved or recessed edge of the fixed pruning member 14.

22 represents the fixed clamping member which has a shank terminating in a tang $22^a$ driven beside the tang $14^a$ into the rod 12, the shank of member 22 having an offset portion $22^b$ and the outer portion of the member 22 having an offset portion $22^c$. Said offset portions separate the member 22 and its shank from the member 14 and its shank, the member 22 being located beside the fixed pruning member 14, and provided with a curved clamping edge 23 which is substantially parallel with the cutting edge 15, and is serrated.

24 represents the movable clamping member which has a slightly curved clamping edge conforming to the curvature of the cutting edge 17 and opposed to the serrated clamping edge 23, and provided with a longitudinal groove 24ª, (Fig. 13) whereby sharp longitudinal twig grasping edges are formed. The movable clamping member 24 is provided with an arm or extension 26 which is pivoted by a screw 27 to the lever 18, said arm having an ear 26ª which bears against said lever, and prevents the entrance of twigs, etc., between the arm and lever, the movable clamping member and its arm being located between the shanks of the members 14 and 22. The screw 27 supports the coiled portion 28 of a spring (Fig. 11) having arms 29—30—one engaging an orifice in the arm 26 and the other an orifice in the lever 18. Said spring is adapted to press the clamping member 24 yieldingly against the pivot screw 19, said member having a notch 31 (Fig. 10) the bottom of which normally bears against said screw which acts as a stop to limit the movement of the clamping member 24 by the spring.

It will be seen from the foregoing that when the lever 18 is moved to cause the cutting action of the pruning members, the fixed clamping member supports the upper side of the branch against the upward pressure exerted on it by the movable shearing member, and that the movable clamping member moves upwardly with the movable shearing member and is pressed against the under side of the branch during the shearing operation, so that the branch is firmly held or clamped at a point in close proximity to the point where it is severed, breaking strain on the branch being thus prevented. When the lever 18 is released, the spring 28 acts to move the movable shearing and clamping members from the fixed shearing and clamping members.

The number of parts of my improved pruning implement is reduced to the minimum, said parts being compactly arranged and adapted to operate with the minimum of frictional resistance. The fixed pruning and clamping members 14 and 22 are spaced apart by the offset portion 22ᵇ at the inner end of the shank of the clamping member 22 and the offset portion 22ᶜ at the outer end of said member, said portion 22ᶜ being attached to the fixed pruning member by a screw 35. Provision is thus made for the free swinging movement of the movable clamping member between the fixed pruning and clamping members. The spring which controls the movable clamping member is located wholly between the lever 18 and arm 26, and is protected thereby.

The pruning members 14 and 16 may be used without the clamping members 22 and 24, said pruning members being characterized by the recessed form or reëntrant curve of the edge 25, and by the salient curve of the edge 17, whereby the latter is adapted to guide twigs and limbs into the recess formed by the reëntrant curve of the edge 15.

The end of the rod 12 into which the shanks of the fixed pruning and clamping members are driven, is embraced by a ferrule 36.

I claim:—

1. A pruning implement comprising a rod or handle, a fixed pruning member attached thereto, a fixed clamping member also attached to said rod or handle and spaced from said fixed pruning member, a pivot pin supported by both of said members, a movable pruning member mounted on said pivot pin, a movable clamping member pivotally supported by said movable pruning member, and a spring acting to press said movable clamping member yieldingly against said pivot pin, said movable clamping member being free to move away from said pivot pin during the clamping operation.

2. A pruning implement comprising a rod or handle, a fixed pruning member attached thereto, a fixed clamping member also attached to said rod or handle and spaced from said fixed pruning member, a pivot pin supported by both of said members, a movable pruning member mounted on said pivot pin, a movable clamping member pivotally supported by said movable pruning member and provided with a recess, and a spring acting to press the recessed portion of said movable clamping member yieldingly against said pivot pin, said movable clamping member being free to move away from said pivot pin during the clamping operation.

3. A pruning implement comprising a rod or handle, a fixed pruning member attached thereto, a fixed clamping member also attached to said rod or handle and spaced from said fixed pruning member, a pivot pin supported by both of said members, a movable pruning member mounted on said pivot pin, a movable clamping member provided with an arm or extension, means for pivotally connecting said arm or extension to said movable pruning member, and means acting on said arm to hold said movable clamping member yieldingly against said pivot pin, said movable clamping member being free to move away from said pivot pin during the clamping operation.

4. A pruning implement comprising a handle, a fixed shearing member carried thereby, a movable shearing member pivotally connected to the fixed member, a clamping member carried by the handle and having offset portions that space the same in parallel relation to the fixed shearing member, said clamping member having a serrated gripping surface, means for fastening the outer end of the clamping member to the outer end of the fixed shearing member, a movable clamping member carried by the movable shearing member and having a longitudinally grooved gripping surface, said movable clamping member projecting between the fixed shearing and clamping members, yieldable means for holding the movable clamping member in engagement with the fixed clamping member, and means for operating the movable shearing member.

In testimony whereof I have affixed my signature, in presence of two witnesses.

EBEN N. HIGLEY.

Witnesses:
C. F. BROWN,
P. W. PEZZETTI.

Copies of this patent may be obtained for five cents each, by addressing the " Commissioner of Patents, Washington, D. C."